US012614999B2

(12) United States Patent　　　　　(10) Patent No.: US 12,614,999 B2
Mastrocola et al.　　　　　　　　　　　(45) Date of Patent: Apr. 28, 2026

(54) CONTROLLER FOR A SWITCHED RELUCTANCE MACHINE

(71) Applicant: Hamilton Sundstrand Corporation, Charlotte, NC (US)

(72) Inventors: Naison E. Mastrocola, Goshen, CT (US); Scott R. Durkee, New Haven, VT (US); Stefanos Skoulaxinos, Cannock (GB); Andrei Dinu, Leicester (GB); Jonathan Mark Roadley-Battin, Birmingham (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 150 days.

(21) Appl. No.: 18/395,427

(22) Filed: Dec. 22, 2023

(65) Prior Publication Data

US 2024/0275322 A1　　Aug. 15, 2024

(30) Foreign Application Priority Data

Feb. 15, 2023　　(EP) ..................................... 23156917

(51) Int. Cl.
　　*H02P 25/08*　　　(2016.01)
　　*H02P 101/30*　　(2015.01)
(52) U.S. Cl.
　　CPC .......... *H02P 25/08* (2013.01); *H02P 2101/30* (2015.01)
(58) Field of Classification Search
　　CPC ..... H02P 25/08; H02P 25/089; H02P 2101/30
　　USPC .......................................................... 318/701
　　See application file for complete search history.

(56) References Cited

U.S. PATENT DOCUMENTS

| | | | |
|---|---|---|---|
| 5,140,243 A * | 8/1992 | Lyons ..................... | H02P 25/08 |
| | | | 318/701 |
| 5,525,886 A | 6/1996 | Lyons et al. | |
| 5,600,218 A | 2/1997 | Holling et al. | |
| 5,864,217 A * | 1/1999 | Lyons ................... | H02P 25/089 |
| | | | 318/715 |
| 6,291,949 B1 | 9/2001 | Green | |
| 6,650,082 B1 | 11/2003 | Du | |
| 6,979,974 B2 | 12/2005 | Slater et al. | |
| 7,271,556 B2 * | 9/2007 | Kishibe ................. | H02P 25/089 |
| | | | 318/700 |
| 8,253,360 B2 | 8/2012 | Schulz et al. | |
| 9,735,723 B2 | 8/2017 | Rutledge et al. | |
| 10,637,378 B2 | 4/2020 | Wangemann et al. | |
| 11,309,819 B2 | 4/2022 | Sega | |

(Continued)

FOREIGN PATENT DOCUMENTS

| | | | | |
|---|---|---|---|---|
| CN | 206252509 U | * | 6/2017 | |
| EP | 3331157 B1 | | 8/2020 | |
| FR | 2959279 A1 | | 10/2011 | |

OTHER PUBLICATIONS

CN_206252509_English_Translation (Year: 2016).*

(Continued)

*Primary Examiner* — Gabriel Agared

(57) ABSTRACT

A controller for a switched reluctance machine, the machine comprising two concurrently energised phases and two concurrently non-energised phases. The controller is configured to, in an injection stage, inject a signal into the two non-energised phases; in a measurement stage, determine a current in each of the two non-energised phases; and in a calculation stage, apply an algorithm to the determined currents to determine a rotor angle.

20 Claims, 5 Drawing Sheets

(56) References Cited

U.S. PATENT DOCUMENTS

| | | | |
|---|---|---|---|
| 11,411,570 B1* | 8/2022 | Zhou | G06F 1/08 |
| 2014/0354196 A1* | 12/2014 | Ahmad | H02P 23/30 |
| | | | 318/254.1 |
| 2016/0190967 A1* | 6/2016 | Takano | H02P 25/086 |
| | | | 318/254.1 |
| 2017/0366126 A1* | 12/2017 | Sinner | H02P 6/185 |
| 2018/0159415 A1* | 6/2018 | Kudligi | H02K 1/14 |
| 2021/0013822 A1* | 1/2021 | Tang | B60L 15/007 |
| 2023/0348053 A1* | 11/2023 | Clark | B64C 29/0025 |

OTHER PUBLICATIONS

IEEE_2018_position_sensorless_control_of_switched_reluctance_motor_drives (Year: 2018).*

Extended European Search Report, of the European Patent Office, dated Jul. 7, 2023, in corresponding European Patent Application No. 23156917.9.

Kim Jongwan et al: "Position Sensorless Control of Switched Reluctance Motor Drives Without Pre-stored Magnetic Characteristics", 2018 IEEE Energy Conversion Congress and Exposition (ECCE), IEEE, Sep. 23, 2018 (Sep. 23, 2018), pp. 1755-1761, XP033463787, DOI: 10.1109/ECCE.2018.8557719 [retrieved on Dec. 3, 2018] abstract; figure 1.

* cited by examiner

CONTROLLER FOR A SWITCHED RELUCTANCE MACHINE

CROSS-REFERENCE TO RELATED APPLICATIONS

This application claims priority to and the benefit of European Patent Application No. 23156917.9, filed Feb. 15, 2023, the entire content of which is incorporated by reference herein.

FIELD OF THE INVENTION

This application relates to a controller for a switched reluctance machine.

BACKGROUND

Switched reluctance machines (SRMs) include a plurality of phases, a stator and a rotor, and may operate as a motor or a generator. In both operational modes, it is critical to know the angle of the rotor for control purposes, which may be determined by an electro-mechanical sensor. In some environments, for example aerospace applications, the machine may operate in extreme temperatures and be subject to vibration sufficient to cause the electro-mechanical sensor to fail. As a result, there is a need for determining the rotor angle without using an electro-mechanical sensor.

SUMMARY

In a first aspect of the invention, there is provided a controller for a switched reluctance machine, the machine comprising two concurrently energised phases and two concurrently non-energised phases, the controller configured to in an injection stage, inject a signal into the two non-energised phases; in a measurement stage, determine the current in each of the two non-energised phases; and in a calculation stage, apply an algorithm to the determined currents to determine a rotor angle.

By providing the injection signal (e.g. a high frequency injection signal) to the two concurrently non-energised phases, and calculating the rotor angle based on the two-non energised phases, the determination of the rotor angle according to the present invention is more reliable.

By having two phases providing information for rotor angle determination, from different locations within the machine, the overall determination of rotor angle is less susceptible to error as any noise from one phase, for example due to Electro Magnetic Interference (EMI), can be compensated for by the other phase which may not be subject to the EMI.

In some examples, the switched reluctance machine comprises a rotor having a rotation cycle, and is configured such that at any point during the rotation cycle two phases of the machine are concurrently non-energised.

In some examples, in the injection stage, the signal is injected into each of the two non-energised phases such that two phases of the machine are receiving the injection signal at any point during the rotation cycle.

In some examples the algorithm comprises signal processing the determined current of each phase to provide processed data for each phase; converting the processed data into an estimated rotor angle for each phase; and averaging the estimated angle from each phase to determine the rotor angle.

In some examples the signal processing comprises applying a first low pass filter to the determined current to provide a filtered current; calculating an absolute value of the filtered current to provide an absolute current; and applying a second low pass filter to the absolute current to provide the processed data.

In some examples the converting comprises using a look-up table to convert the processed data into an estimated rotor angle.

In some examples the algorithm further comprises providing the determined rotor angle to a closed loop PI tracker. A PI tracker is an effective way of reducing the error in the rotor angle, making the tracking smoother, and filtering out sampling errors.

In some examples the signal has a duty cycle of less than 50%. In some examples, the signal has a frequency of 30 kHz. Using a frequency that is considerably higher than the normal operating frequency of the machine ensures minimal torque ripple and low levels of acoustic noise.

In some examples the controller is further configured to, in a power management stage, configure the flow of electrical power to or from the machine.

In some examples the controller is further configured to, in the calculation stage, provide the power management stage with the determined rotor angle; and in the power management stage, control the flow of electrical power to or from the machine based on the rotor angle.

In some examples the controller is configured to, in the power management stage, control the flow of electrical power by controlling a timing of the electrical power supplied to each phase, or a rectification of the electrical power received by each phase.

In some examples the switched reluctance machine comprises four phases; wherein in the power management stage, the controller is configured to control the flow of electrical power such that an initial motoring period of a first phase occurs concurrently with: a final generation period of a second phase, an initial generation period of a third phase, and a final motoring period of a fourth phase.

In some examples the controller is configured to control the machine as a motor; wherein in the power management stage, the controller is configured to control the flow of electrical power to energise each phase during a motoring period to produce a motoring torque, and to energise the phases such that two phases are concurrently non-energised; and wherein in the injection stage the controller is configured to inject each phase during an initial generation period and a final generation period.

In some examples a rotor of the machine is configured to energise each phase during a generation period to generate electrical power, and the machine is configured such that two phases are concurrently non-energised; and the controller is configured to control the machine as a generator; and in the injection stage, the controller is configured to inject each phase during an initial motoring period and a final motoring period.

In a second aspect of the invention there is provided a switched reluctance machine comprising a rotor comprising a plurality of magnetic elements; a stator comprising two concurrently non-energised phases; and the controller of the first aspect configured to control the machine as a motor or as a generator.

In a third aspect of the invention there is provided an aircraft comprising the switched reluctance machine of the second aspect.

In some examples, when the controller is configured to control the machine as a motor, the machine is connected to a propeller assembly and provides a propulsive force to propel the aircraft; and when the controller is configured to control the machine as a generator, the machine is connected to a turbine and provides an output of electrical energy for the aircraft.

In a fourth aspect of the invention, there is provided a method for controlling a switched reluctance machine, the machine comprising two concurrently non-energised phases; the method comprising injecting a signal into the two non-energised phases; determining the current in each of the two non-energised phases; and applying an algorithm to the determined currents to determine the rotor angle.

In some examples the method further comprises energising the phases such that two phases are concurrently non-energised.

The switched reluctance machine of the second aspect and the aircraft of the third aspect may each comprise any of the features of the examples described with respect to the first aspect. The method of the fourth aspect may include any functional steps described in relation to the examples of the first and second aspects.

BRIEF DESCRIPTION OF THE DRAWINGS

Various examples will now be described with reference to the accompanying drawings in which.

DETAILED DESCRIPTION

Figure 1:
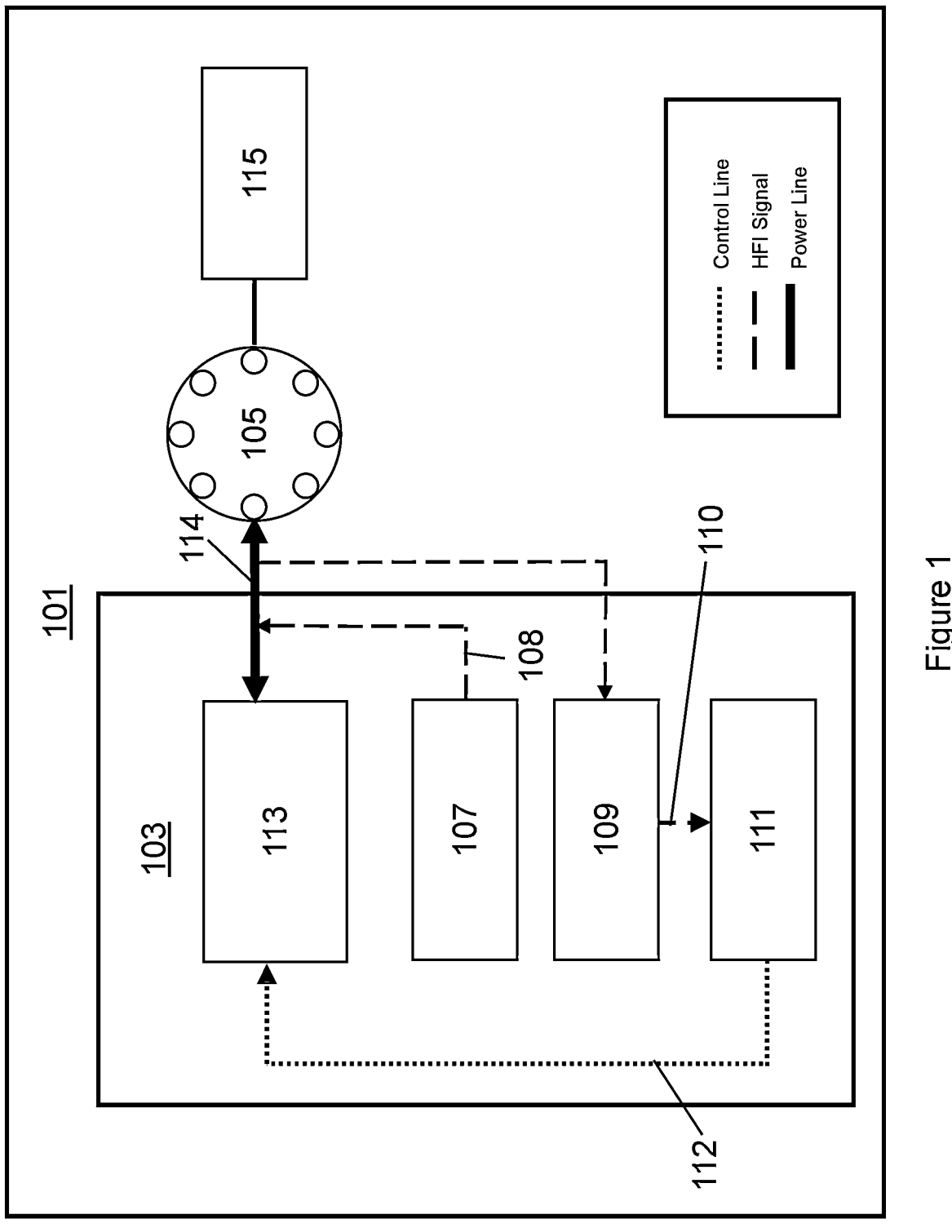
FIG. 1 shows a schematic overview of an aircraft, a controller, a switched reluctance machine and an aircraft component.

With reference to FIG. 1, an aircraft 101 comprises a switched reluctance machine (SRM) 105, a controller 103, and an aircraft component 115. The controller may comprise a power management unit 113.

The SRM 105 is mechanically coupled to the aircraft component 115, which may be, for example, a turbine and/or a propeller assembly comprising, for example, a propeller and a gearbox. The SRM 105 can be configured to operate as a motor or as a generator. The SRM 105 may be switchable between the two operating modes, depending on the requirements of the aircraft 101.

The SRM 105 comprises a stator, a rotor, and a plurality of phases, which are described in more detail below.

The power management unit 113 is configured to control the flow of electrical power to or from the SRM 105 via a power line 114. The power line 114 includes a plurality of connections, each connection connecting to a phase or a pole of the SRM 105. A phase of the SRM 105 may comprise two poles. Each connection in the power line 114 may be connected to a phase, which drives two poles simultaneously, or connected to a specific pole within a phase. In this manner, each connection may be connected to a phase or a pole.

Figure 2:
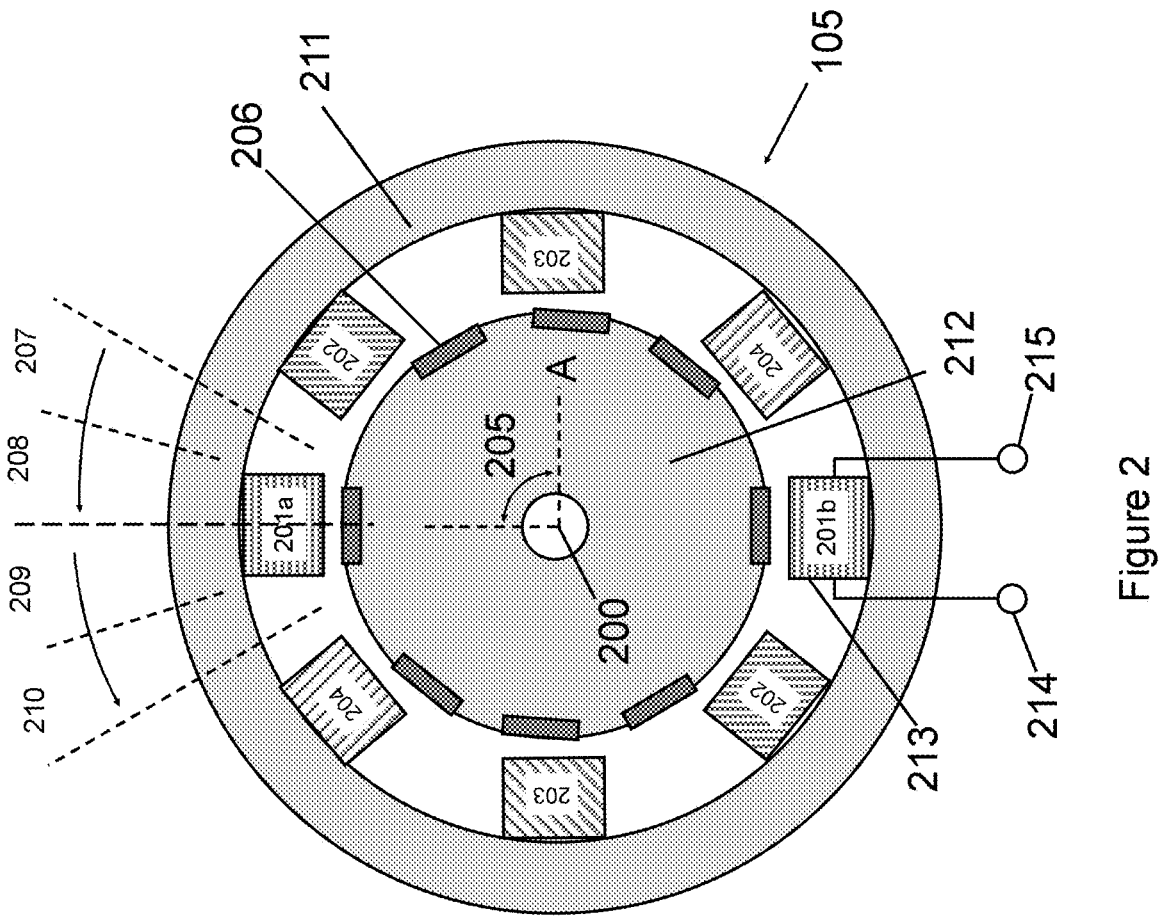
FIG. 2 shows a cross section of an exemplary switched reluctance machine.

Each connection is able to transfer electrical power with a high voltage and/or current, for example hundreds of volts and/or tens of amps. Each connection includes an input 214 and an output 215 (as shown in FIG. 2 and described in more detail below), wherein the phase or pole of the SRM 105 is connected between the input and the output, such that current travels towards the phase or pole at the input and away from the phase or pole at the output.

The controller 103 comprises an injection unit 107, a measurement unit 109, and a calculation unit 111. The controller may also comprise the power management unit 113.

The injection unit 107 is configured to inject a signal 108 into the SRM 105 via the power line 114. The injection unit 107 is connected to each phase of the SRM 105 via the input connections within the power line 114, such that the injection unit 107 can inject the signal 108 into each individual phase of the SRM 105 separately. Each phase of the SRM 105 may thus receive a signal 108 at a specific time interval.

The signal 108 may be a high frequency injection (HFI). A HFI signal is a voltage waveform with a frequency significantly higher than a normal operating frequency of an electrical component (for example the signal 108 would be at a frequency significantly higher than the frequency of the voltage and current in the power line 114 during a normal operating condition of the SRM 105, as described in more detail below).

The frequency and duty cycle of the signal 108 are two parameters that may be customized for an application. The signal 108 may be a square wave with a duty cycle of less than 50%. The signal 108 may have a frequency of 30 kHz. The voltage of the signal 108 may be at the same voltage level of the power supplied to the SRM 105.

The measurement unit 109 is connected to the SRM 105 via the power line 114. The measurement unit 109 is connected to each phase of the SRM 105 via the connections in the power line 114, such that the measurement unit 109 can determine a high frequency current on each individual phase of the SRM 105 separately. The high frequency current is a result of the signal 108 injected into the phase of the SRM 105. Thus, when the signal 108 is injected into a phase of the SRM 105, the measurement unit 109 can determine the current as a result of the injected signal 108. The measurement unit 109 outputs the determined current 110 to the calculation unit 111.

The calculation unit 111 receives the determined current 110 and determines the rotor angle 112, by applying an algorithm which is described in more detail below. The rotor angle 112 is received by the power management unit 113 and used to control the flow of power to or from the SRM 105.

As shown in FIG. 2, the SRM 105 comprises a rotor 212 which rotates about an axis 200. The rotor 212 is, at any specific point in time, at an angle 205, which is the rotation of the rotor 212 relative to an axis A. The rotor 212 further comprises a plurality of magnetic elements 206. The magnetic elements 206 may be configured in or on the rotor 212 in any number of ways as is known in the art. The non-limiting example of FIG. 2 depicts the rotor 212 comprising eight magnetic elements 206, each spaced around the outer circumference of the rotor 212.

The SRM 105 further comprises a stator 211, and a plurality of phases 201, 202, 203, 204 which are mechanically fixed to the stator 211. Each phase 201, 202, 203, 204 comprises a pair of poles 201a, 201b. Each pole 201b comprises a coiled wire 213, an input 214 and an output 215. The direction of the input 214 and the output 215 is relative to the coil 213 and may or may not be significant to the operation of the pole 201b or the phase 201. In FIG. 2 phase 201 is shown to have a pole-pair 201a, 201b, and only pole 201b is shown to have the coil 213, the input 214, and the output 215; however it is to be understood that each of the phases 201, 202, 203, 204 are in pole-pairs, and each of the poles comprise a coil, an input and an output.

The magnetic elements 206 in the rotor 212 are configured to magnetically interact with the phases 201, 202, 203, 204 as the rotor 212 rotates.

The power management unit 113 is configured to divide each pole into four periods: an initial motoring period 207, a final motoring period 208, an initial generation period 209, and a final generation period 210. By dividing each pole into these four periods, the power management unit 113 can effectively control the power, including the timing of power cycles, delivered to or received from a four phase SRM 105.

The initial motoring period 207 begins once the element 206 is closer to the pole 201a than the previous pole 202. Between the initial motoring period 207 and the final motoring period 208, the element 206 moves rotationally towards the pole 201a. The final motoring period 208 ends as the magnetic element 206 is at a shortest rotational distance from the pole 201a. The initial generation period 209 begins when the element 206 is at the shortest rotational distance from the pole 201a. Between the initial generation period 209 and the final generation period 210, the element 206 moves rotationally away from the pole 201a. The final generation period 210 ends when the element 206 is closer to the pole 204 than the pole 201a.

The SRM 105 may operate as a motor or as a generator. In a motoring mode, the phases 201, 202, 203, 204 receive electrical power from the power management unit 113, via power line 114, which causes the phases 201, 202, 203, 204 to generate a phase magnetic field. In general, the phase magnetic fields interact with the magnetic fields associated with the magnetic elements 206, which develops a rotational force on the rotor 212 which causes the rotor 212 to rotate.

For the rotational force to be efficiently and effectively developed, each of the phases 201, 202, 203, 204 must receive electrical power, and thus generate a respective phase magnetic field, at a precise time.

If a phase 201, 202, 203, 204 receives electrical power before the initial motoring period 207, then, as a result of the rotational distance between the element 206 and the respective phase, the phase magnetic field will not interact with the element magnetic field, and a rotational force will not be developed. As a result, the electrical power used to energise the respective phase is wasted. In this manner the SRM 105 would operate inefficiently as a motor.

If a phase 201, 202, 203, 204 receives electrical power after the final motoring period 208, for example from the initial generation period 209 until the final generation period 210, the rotational force developed on the rotor as a result of the interaction between the phase magnetic field and element magnetic field will be in an opposite direction compared to the rotation of the rotor 212. In this manner, the SRM 105 would operate ineffectively as a motor.

Accordingly, the precise timing of the electrical power delivered to the phases 201, 202, 203, 204 is critical to the effective and efficient operation of the SRM 105 as a motor.

In a generation mode, the element magnetic fields energise the phases 201, 202, 203, 204 which generates electrical power. In the generation mode, the phases 201, 202, 203, 204 are energised (and thus generate electrical power) from the initial generation period 209 to the final generation period 210. Rectification of the generated electrical power, via the power line 114 and the power management unit 113, requires precise timing control for efficient power conversion, in a similar manner to the motoring example provided above.

In both operating modes, the positional relationship between the elements 206 and the phases 201, 202, 203, 204 is critical to efficient and effective control of the SRM 105.

The positional relationship is determined by the rotor angle 205. Thus, by accurately determining the rotor angle 205, the timing requirements of the power delivered to or generated from the phases 201, 202, 203, 204 can be controlled such that the SRM 105 can operate efficiently and effectively in either a motoring or generation mode.

As discussed in the background section, the SRM 105 may operate in extreme temperatures and be subject to vibration, for example in aerospace applications, which may cause an electro-mechanical sensor to fail. This makes a need for determining the rotor angle without using an electro-mechanical sensor.

Figure 5:
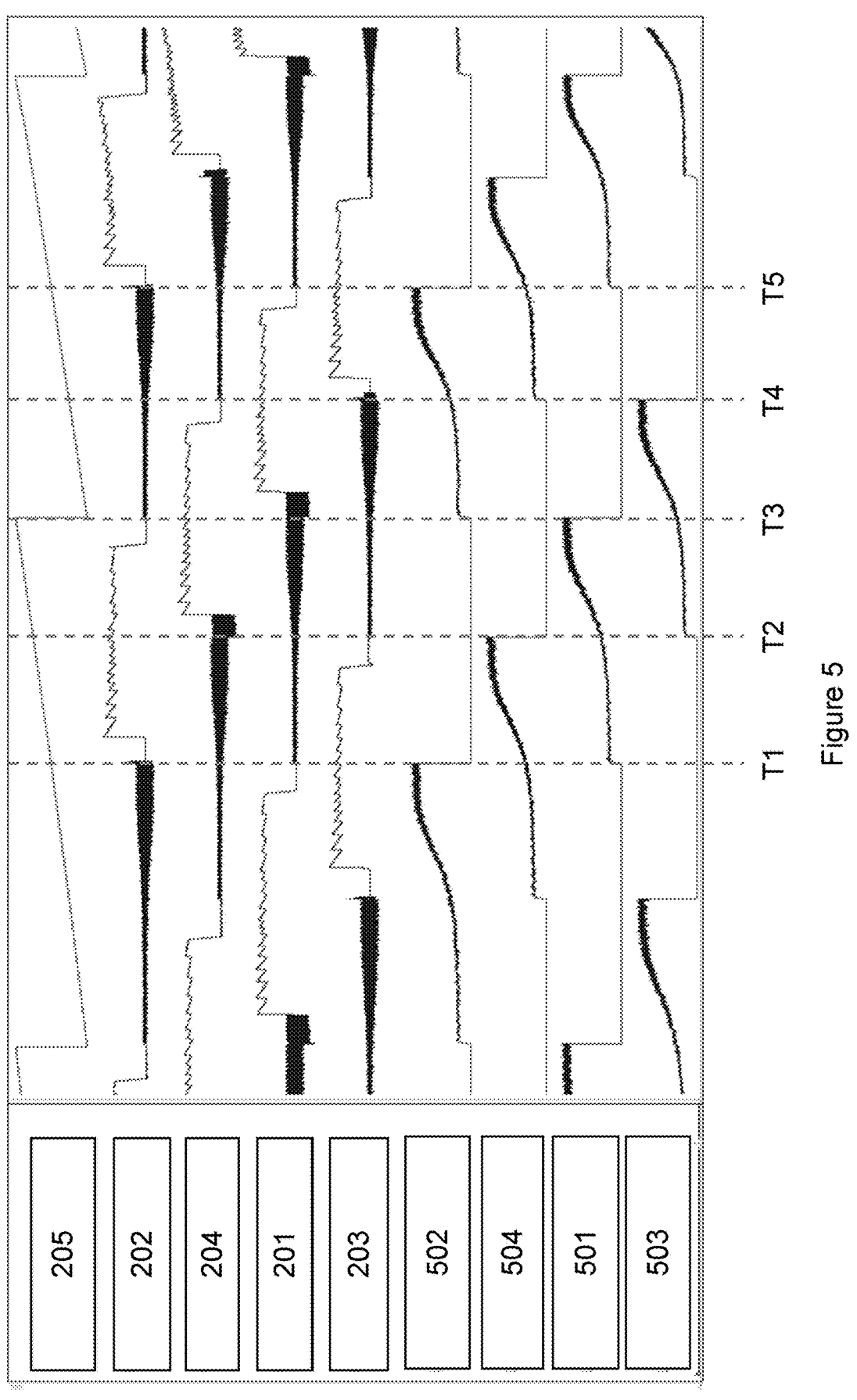
FIG. 5 shows a graph of the phase currents and processed data of an exemplary four phase motor.

Referring to FIG. 2 and FIG. 5, an example of a four phase SRM 105 in a motoring mode is disclosed. In particular, FIG. 2 illustrates a phase and rotor arrangement at a first time interval T1. FIG. 5 illustrates the rotor angle 205, the current in each phase 201, 202, 203, 204 and the processed data waveforms 501, 502, 503, 504 for each phase (as described in more detail below) from the first time interval T1 through to a final time interval T5. The rotor 212 completes one full rotation between the first time interval T1 and the final time interval T5.

Between the time T1 and T2, the power management unit 113 provides electrical power to the phase 203 which is beginning a final motoring period 208; and to the phase 202 which is in an initial motoring period 207. By providing electrical power to energise two phases simultaneously, ripple torque in the rotor 212 can be reduced.

In order to determine the rotor angle 205, the signal 108 is injected into two non-energised phases. A non-energised phase may be a phase which is neither receiving nor generating electrical power. At time T1, phases 201, 204 are non-energised. The injection unit 107 provides the signal 108 to phase 201 which is beginning an initial generation period 209, and to phase 204 which is in a final generation period 210.

As mentioned above, a high frequency injection (HFI) signal is a signal with a frequency considerably higher than the normal operating frequency of the electrical component. As a result of the high frequency component, a HFI signal does not interfere with the normal operation of the SRM 105. By injecting a high frequency voltage signal 108 into the two non-energised phases 201, 204 and measuring the current response, the rotor angle 205 can be determined. This is because the current response of the high frequency voltage signal 108 is particularly dependent upon the inductance of the phase 201, 204, and the inductance of the phase 201, 204 changes as a result of flux linkage between the phase 201, 204 and a nearby element 206, which is a result of the rotational distance between the element 206 and the phase 201, 204. Therefore at any point in time, the current response as a result of the high frequency voltage signal 108 injected into a non-energised phase will be proportional to the rotor angle 205.

The equation that applies for the phase voltage of an SRM is shown in Equation 1:

$$V_{ph} = R_{ph} \cdot i_{ph} + \frac{d\Psi}{dt} \qquad \text{Equation 1}$$

US 12,614,999 B2

7

Where $R_{ph}$ is motor phase resistance, $i_{ph}$ is motor phase current and $\Psi$ is the flux linkage. The flux linkage can be defined in equation 2:

$$\Psi = L(\theta) \cdot i_{ph} \qquad \text{Equation 2}$$

Where $L(\theta)$ is the phase inductance. Taking into account Equation 2, Equation 1 becomes:

$$V_{ph} = R_{ph} \cdot i_{ph} + L(\theta) \cdot \frac{di_{ph}}{dt} + i_{ph} \cdot \omega \cdot \frac{dL(\theta)}{d\theta} \qquad \text{Equation 3}$$

Equation 3 shows how the voltage applied to each of the phases of the SRM 105 consists of three voltage drops. Upon injection of the high frequency voltage signal 108, the term containing di/dt is large and the other two terms are negligible. This is because the other two terms contain the phase current $i_{ph}$, which is zero when the phase is not energized.

Accordingly, the injection unit 107 injects the signal 108 ($V_{ph}$) into an input connection of the non-energized phases 201, 204 through the power line 114. The phases 201, 204 receive the signal 108, and the current changes (di/dt) as the inductance (L(θ)) in the phases 201, 204 changes proportionally to the rotor angle 205. The measurement unit 109, connected to the non-energized phase 201, 204 via the power line 114, determines the current and provides this information to the calculation unit 111 as the determined current 110.

Figure 3:
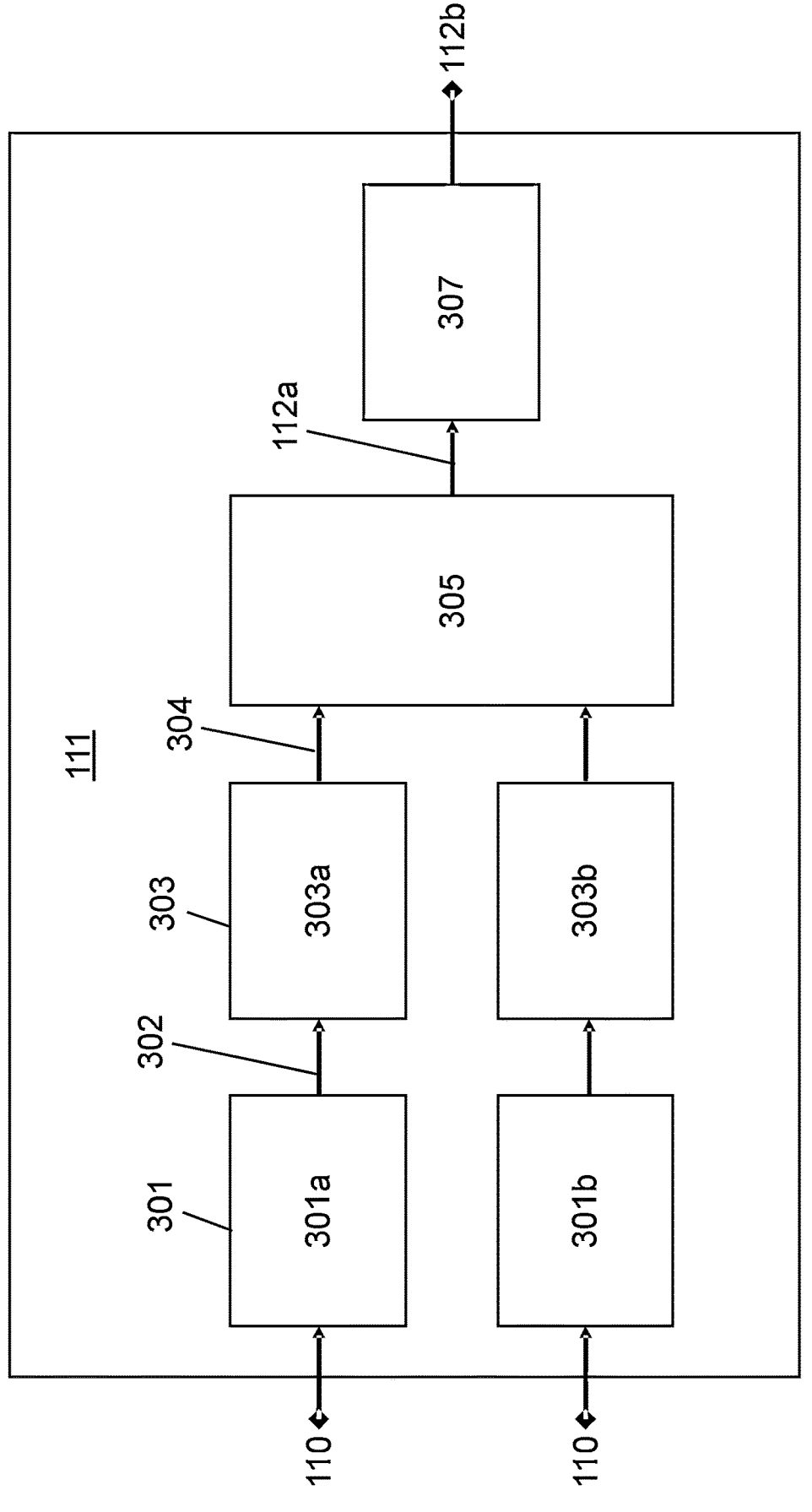
FIG. 3 shows a block diagram of the calculation stage.

Referring to FIG. 3, the calculation unit 111 applies an algorithm to the determined current 110 in order to provide a determined rotor angle 112. The calculation unit 111 applies the algorithm to the determined current 110 received from each non-energized phase 201, 204 simultaneously.

The algorithm comprises a signal processing step 301, which signal processes the determined current 110 to provide processed data 302. The signal processing step 301 is done for each phase 201, 204 separately, illustrated by the parallel blocks 301a, 301b. Accordingly, two sets of processed data 302 are generated, however for conciseness only one is labelled.

Figure 4:
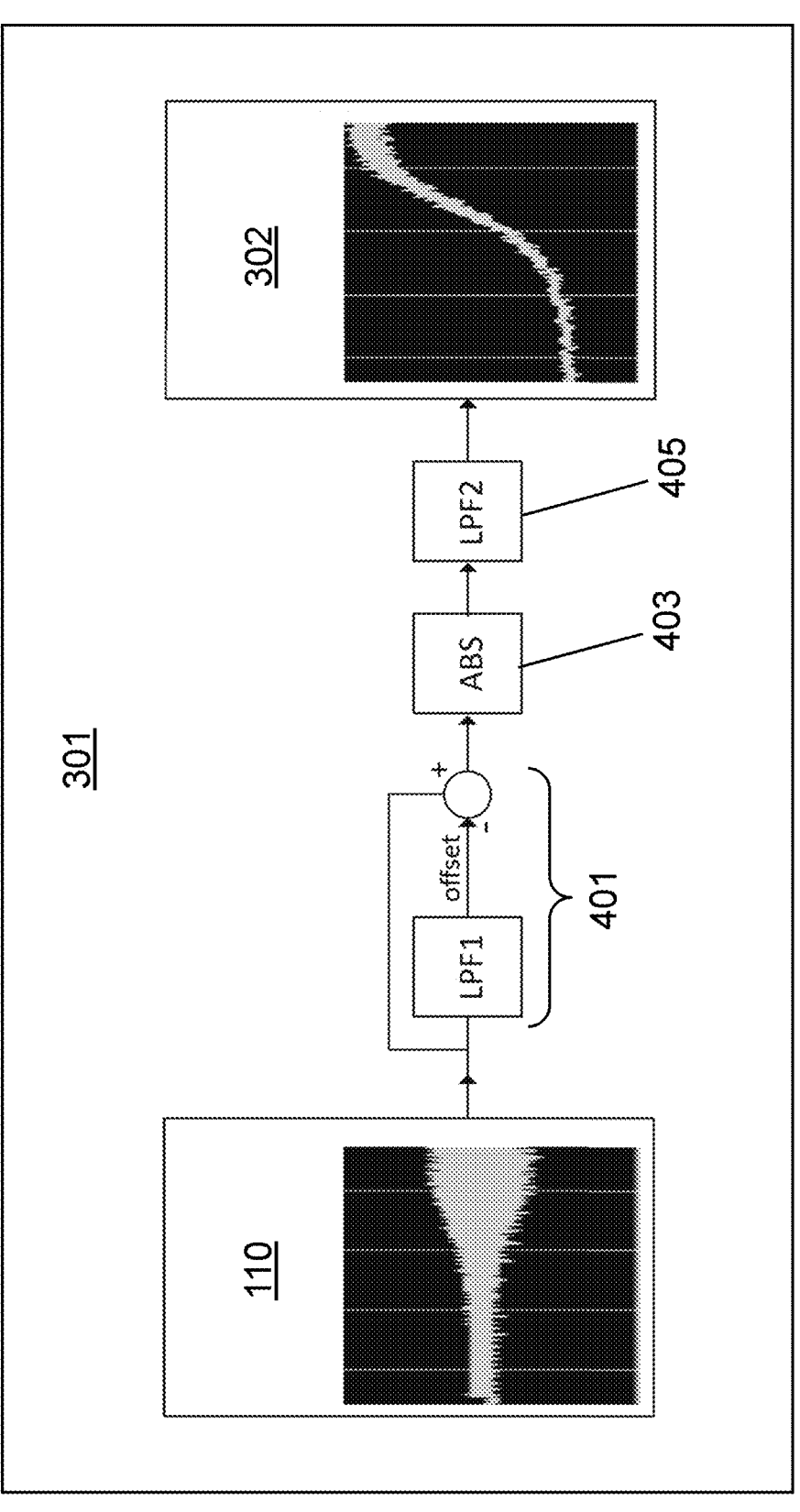
FIG. 4 shows a block diagram of signal processing.

Referring to FIG. 4, the signal processing step 301 comprises applying a first low pass filter 401 to the determined current 110 to provide a filtered current. The first low pass filter 401 is able to correct for any DC offset in the determined current 110. Thus, the first low pass filter 401 is applied to the determined (phase) current 110 to determine and remove any DC offset, and thereby provide a DC offset corrected phase current.

An absolute value 403 of the filtered current (for example, the DC offset corrected phase current) is then calculated in order to provide an absolute current. The absolute value calculation converts any negative components of a signal into a positive component. Calculating the absolute value therefore rectifies the filtered current (DC offset corrected phase current).

A second low pass filter 405 is then applied to the absolute current (for example, rectified and DC offset corrected phase current) to provide the processed data 302. The second low pass filter 405 removes high frequency oscillations. Applying a second low pass filter 405 to the absolute current converts any high frequency signal components to a usable low frequency amplitude (for example, a smooth curve) and thereby provides the processed data 302. The low frequency amplitude processed data 302 can thus be used to establish rotor position.

In FIG. 5, the processed data 302 is displayed for each phase 201, 202, 203, 204 as processed data waveforms 501, 502, 503, 504. The processed data waveforms 501, 502, 503, 504 are calculated in real time as discussed above. At time T1, because the non-energised phase 201 is in the initial generation period 209, and the non-energised phase 204 is in the final generation period 210, the corresponding processed data waveforms 501, 504 are at different positions within the waveform cycle. In particular, the waveform 504 is approximately halfway through the waveform 504 cycle, whereas the waveform 501 is at the start of the waveform 501 cycle. In this manner, the two sets of processed data 302 provided from the non-energised phases 201, 204 are different, the difference corresponding to a difference between the relative position of a nearby element 206 and the phase 201, 204.

Referring again to FIG. 3, the processed data 302 is converted in a conversion step 303 into an estimated rotor angle 304 for each phase 201, 204. The conversion step 303 is done for each phase 201, 204 separately, illustrated by the parallel blocks 303a, 303b. The conversion step 303 uses a look-up table which correlates the processed data 302 (in the form of a current reading in amps) into an estimated rotor angle 304 (in degrees or radians). Because the waveforms 501, 504 are at different positions, the look-up table uses a separate data set for each phase. Thus, the current readings from the waveforms 501, 504 will correlate to substantially the same rotor angle estimation. Accordingly, two estimated rotor angles 304 are generated.

The two estimated rotor angles 304 are provided to an averaging step 305. The averaging step 305 takes an average (for example, an arithmetic average) of the two estimated rotor angles 304, and outputs a determined rotor angle 112a.

This process allows the rotor angle 205 to be determined based on two separate positions within the SRM 105. This advantageously helps reduce error in the determined rotor angle 205.

In some embodiments, the determined rotor angle 112a is provided to a closed-loop Proportional-Integral (PI) tracker step 307, which reduces the error in the determined rotor angle 112a and provides a rotor angle with reduced error 112b.

Referring to FIG. 5, between the time T1 and T2, two phases 202, 203 are energised (and providing a rotational force as described above) and two phases 201, 204 are non-energised and thus receive the signal 108 for determining the rotor angle 205. Before time T2, phase 203 ends its final motoring period 208 and becomes non-energised. At time T2 phase 203 begins its initial generation period 209, wherein it receives the signal 108 for determining the rotor angle 205.

At time T2 phase 202 continues to be energised and provides a rotational force, as it moves from its initial motoring period 207 to its final motoring period 208. At the same time phase 201 continues to receive the signal 108 for determining the rotor angle 205, as it moves from its initial generation period 209 to its final generation period 210. At the same time, phase 204 ends its final generation period 210, wherein it stops receiving the signal 108, and becomes energised to provide the rotational force in its initial motoring period 207.

As illustrated in FIG. 5, the energised phases and the phases receiving the signal 108 continue to change sequentially as the rotor 212 rotates. During any time period (T1 to T5) two phases are concurrently non-energised and receiving the signal 108, and two phases are energised providing the rotational force. However, during no time period is any phase 201, 202, 203, 204 in the same period 207, 208, 209, 210 as another phase, meaning the rotational force and the processed data 302 always comes from two separate phases at different rotational positions. This can be seen in the waveforms 201, 202, 203, 204 and the waveforms 501, 502, 503, 504 over the period T1 to T5.

In the present invention, because two phases are concurrently non-energised, the two phases will always be available to receive the (HFI) signal. As a result, the controller can readily be provided with information of the inductance of two separate phases to determine the rotor angle. The probability of two phases producing an error is lower than one phase producing an error. By providing the signal to the two concurrently non-energised phases the determination of the rotor angle according to the present invention is more reliable.

Furthermore, the two non-energised phases can provide information from two different locations within the machine. This allows the processing stage to receive more comprehensive information related to the inductance of the phases, which can be used to more accurately determine the rotor angle. This is because the error is greatest at the beginning and at the end of the measurement stage (and thus at the beginning and end of the processed data), because the gradient of the processed data curve is the lowest during this period. By having two phases in separate positions provide information on the rotor angle, only one phase will be at the beginning or end of the measurement stage. Thus, the overall determination of rotor angle is less susceptible to error and more accurate.

Additionally, two concurrently energised phases in the SRM advantageously provides the rotational force concurrently from two positions within the SRM, which reduces current ripple.

The present invention thus allows for an SRM to operate in a manner where at any point in time two phases are used for torque production and two-phases are used for High Frequency Injection. The present invention therefore discloses a 2-phase torque 2-phase HFI pattern.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. An apparatus for a switched reluctance machine, the switched reluctance machine comprising two concurrently energized phases and two concurrently non-energized phases, the apparatus comprising:
  a controller configured to:
    in an injection stage, inject a signal into the two non-energized phases;
    in a measurement stage, determine a current in each of the two non-energized phases; and
    in a calculation stage, process the determined currents to determine a rotor angle;
  wherein, to process the determined currents, the controller is configured to:
    perform signal processing of the determined current of each phase to provide processed data for each phase;
    convert the processed data into an estimated rotor angle for each phase; and
    average the estimated rotor angle from each phase to determine the rotor angle.

2. The apparatus of claim 1, wherein, to perform the signal processing, the controller is configured to:
  apply a first low pass filter to the determined current of each phase to provide a filtered current of each phase;
  calculate an absolute value of the filtered current of each phase to provide an absolute current of each phase; and
  apply a second low pass filter to the absolute current of each phase to provide the processed data for each phase.

3. The apparatus of claim 1, wherein, to convert the processed data, the controller is configured to use a look-up table to convert the processed data for each phase into the estimated rotor angle for each phase.

4. The apparatus of claim 1, wherein, to process the determined currents, the controller is further configured to provide the determined rotor angle to a closed-loop Proportional-Integral (PI) tracker.

5. The apparatus of claim 1, wherein the signal has at least one of:
  a duty cycle of less than 50%; or
  a frequency of 30 kHz.

6. The apparatus of claim 1, wherein the controller is further configured to:
  in the calculation stage, provide a power management stage with the determined rotor angle; and
  in the power management stage, control a flow of electrical power to or from the switched reluctance machine based on the rotor angle.

7. The apparatus of claim 6, wherein, to control the flow of electrical power, the controller is configured to control:
  a timing of the electrical power supplied to each phase, or
  a rectification of the electrical power received from each phase.

8. The apparatus of claim 6, wherein the controller is configured to control the flow of electrical power such that an initial motoring period of a first phase occurs concurrently with a final generation period of a second phase, an initial generation period of a third phase, and a final motoring period of a fourth phase.

9. The apparatus of claim 6, wherein:
  the controller is configured to control the switched reluctance machine as a motor;
  in the power management stage, the controller is configured to control the flow of electrical power to energize each phase during a motoring period to produce a motoring torque and to energize the phases such that two phases are concurrently non-energized; and
  in the injection stage, the controller is configured to inject each phase during an initial generation period and a final generation period.

10. The apparatus of claim 6, wherein:
  a rotor of the switched reluctance machine is configured to energize each phase during a generation period to generate electrical power;

the controller is configured to control the switched reluctance machine as a generator; and in the injection stage, the controller is configured to inject each phase during an initial motoring period and a final motoring period.

11. A switched reluctance machine comprising:

a rotor comprising a plurality of inductive or magnetic elements;

a stator comprising two concurrently non-energized phases and two concurrently energized phases; and the controller of claim 1 configured to control the switched reluctance machine as a motor or as a generator.

12. An aircraft comprising the switched reluctance machine of claim 11.

13. The aircraft of claim 12, wherein:

when the controller is configured to control the switched reluctance machine as a motor, the switched reluctance machine is connected to a propeller assembly and is configured to provide a propulsive force to propel the aircraft; and when the controller is configured to control the switched reluctance machine as a generator, the switched reluctance machine is connected to a turbine and is configured to provide an output of electrical energy for the aircraft.

14. A method for controlling a switched reluctance machine, the switched reluctance machine comprising two concurrently energized phases and two concurrently non-energized phases, the method comprising:

injecting a signal into the two non-energized phases;

determining a current in each of the two non-energized phases;

processing the determined currents to determine a rotor angle; and controlling a flow of electrical power to or from the switched reluctance machine based on the rotor angle;

wherein the flow of electrical power is controlled such that an initial motoring period of a first phase occurs concurrently with a final generation period of a second phase, an initial generation period of a third phase, and a final motoring period of a fourth phase.

15. The method of claim 14, wherein processing the determined currents comprises:

performing signal processing of the determined current of each phase to provide processed data for each phase;

converting the processed data into an estimated rotor angle for each phase; and averaging the estimated rotor angle from each phase to determine the rotor angle.

16. The method of claim 15, wherein performing the signal processing comprises:

applying a first low pass filter to the determined current of each phase to provide a filtered current of each phase;

calculating an absolute value of the filtered current of each phase to provide an absolute current of each phase; and applying a second low pass filter to the absolute current of each phase to provide the processed data for each phase.

17. The method of claim 15, wherein converting the processed data comprises using a look-up table to convert the processed data for each phase into the estimated rotor angle for each phase.

18. The method of claim 14, further comprising providing the determined rotor angle to a closed-loop Proportional-Integral (PI) tracker.

19. An apparatus for a switched reluctance machine, the switched reluctance machine comprising two concurrently energized phases and two concurrently non-energized phases, the apparatus comprising:

a controller configured to:

in an injection stage, inject a signal into the two non-energized phases;

in a measurement stage, determine a current in each of the two non-energized phases;

in a calculation stage, process the determined currents to determine a rotor angle; and in a power management stage, control a flow of electrical power to or from the switched reluctance machine based on the rotor angle;

wherein the controller is configured to control the flow of electrical power in the power management stage such that an initial motoring period of a first phase occurs concurrently with a final generation period of a second phase, an initial generation period of a third phase, and a final motoring period of a fourth phase.

20. The apparatus of claim 19, wherein the controller is configured to selectively control the switched reluctance machine as a motor or as a generator.

* * * * *